July 27, 1926.
G. W. BERRY
TIRE RIM TOOL
Filed Oct. 17, 1925
1,593,894
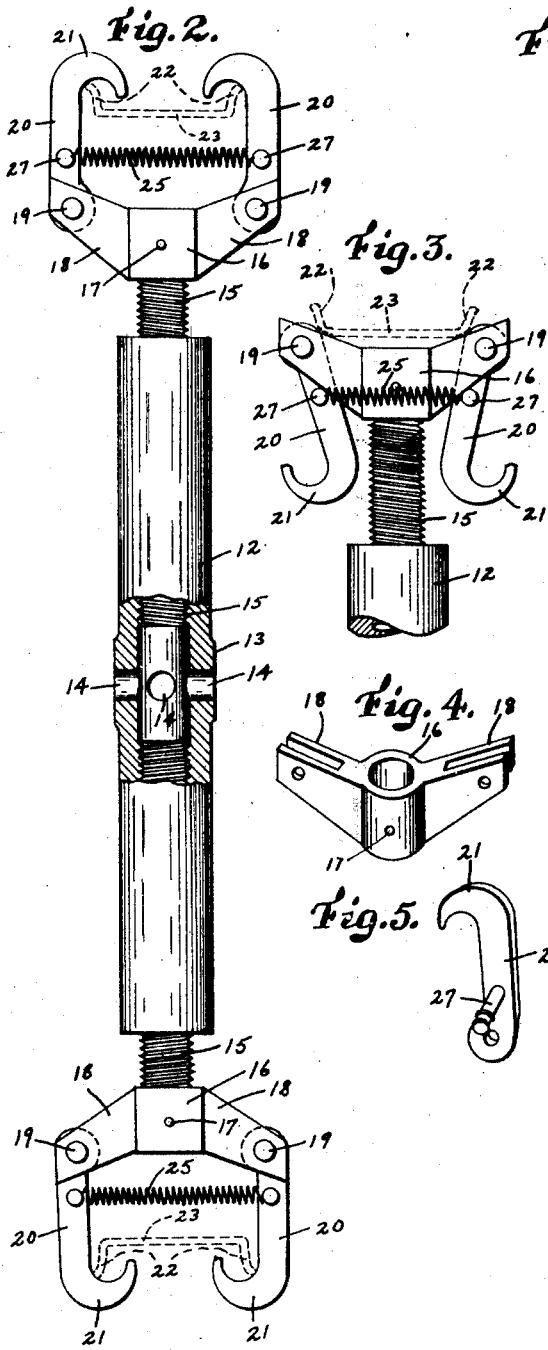
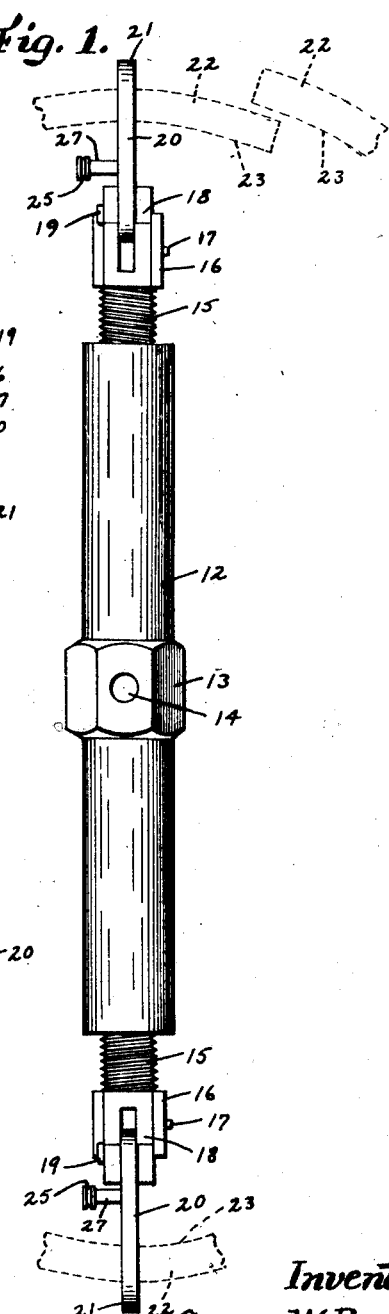
Inventor
George W. Berry
by Knight Brown Quinby Mays
Attys.

Patented July 27, 1926.

1,593,894

UNITED STATES PATENT OFFICE.

GEORGE W. BERRY, OF WOLFEBORO, NEW HAMPSHIRE.

TIRE-RIM TOOL.

Application filed October 17, 1925. Serial No. 62,957.

This invention relates to a tire rim tool, adapted to expand and contract the split rim of a motor vehicle tire, the tool including a turnbuckle and rim-engaging means carried by the longitudinally movable members of the turnbuckle.

This invention is embodied in the improvements hereinafter described and claimed.

Of the accompanying drawings forming a part of this specification,—

Figure 1 is a side view of a rim tool embodying the invention, looking toward one side of the tool, and showing it adapted to contract a rim.

Figure 2 is a side view, looking toward another side, the central member of the turnbuckle being shown partly in section.

Figure 3 is a view similar to a portion of Figure 2, showing the tool adapted to expand the rim.

Figures 4 and 5 are perspective views, showing respectively, one of the heads and one of the hooks shown by the preceding figures.

The same reference characters indicate the same parts in all of the figures.

The turnbuckle includes an internally threaded rotatable central member 12, preferably provided at its midlength with an externally hexagonal enlargement 13, adapted to be engaged by a wrench. This portion of the member may be provided with radial holes 14, in which a screw-driver or other elongated article may be inserted, to provide a lever whereby the member may be rotated.

The externally threaded end members 15 of the turnbuckle are provided at their outer ends with heads which include hubs 16, fixed as by pins 17, to the members 15, and ears 18, projecting in opposite directions from the hubs, the ears being preferably slotted, as shown by Figure 4, and overhanging the members 15. Connected by pivots 19 with the outer ends of the ears 18, are hooks including elongated shank portions 20, and hooked outer end portions 21, projecting inward from the shank portions, said hooks being adapted to be projected outward lengthwise of the tool as shown by Figures 1 and 2, and formed to engage the flanges 22 of a split rim 23, and exert contracting pressure thereon, when the turnbuckle is being contracted.

The pivots 19 engage the inner ends of the shank portions 20, and are widely spaced apart, as shown by Figure 2. The arrangement is such that strain exerted on the hooks by the contraction of the turnbuckle, tends to swing or press the shank portions 20 inward, and cause the hooked portions 21 to firmly engage the rim flanges without liability of slipping therefrom.

The shank portions 20 are preferably connected by springs 25 exerting an inward pull and causing the hooked portions 21 to spring into engagement with the rim flanges.

The outer faces of the heads form outwardly facing seats, adapted to bear, as shown by Figure 3, on the inner surface of the rim 23, and exert expanding pressure thereon, the bearing of the seats on the rim preventing rotation of the members 15 with the member 12. The seats are preferably dished or recessed, as shown by Figures 3 and 4, so that the heads are free from liability to slip crosswise of the rim.

The hooks are adapted to be shifted so that they may be swung or retracted inward from the heads, as shown by Figure 3, thus leaving the seats formed by the outer faces of the heads, unobstructed. To enable the springs 25 to confine the hooks inwardly projected and in out of the way positions, I provide the hooks with laterally projecting studs 27, with the outer ends of which the springs 25 are connected. The springs are offset from the heads by the studs, as indicated by Figure 1, so that when the hooks are shifted or swung inward, the springs are shifted with the hooks, as indicated by Figure 3, and are adapted to confine the hooks in their retracted positions. This confinement of the hooks ensures compactness when the tool is not in use, and permits the storage of the tool in a tool-box without liability of entangling the hooks with other tools in the box.

I claim:

1. A tire rim tool comprising a turnbuckle including an internally threaded rotatable central member, and externally threaded end members movable longitudinally in opposite directions by the rotation of the central member; heads fixed to the outer ends of the end members and overhanging the end and central members at opposite ends of the tool; hooks pivoted in pairs to opposite outer portions of the heads, and adapted to be projected outward lengthwise of the tool and engage the flanges of a split rim to exert contracting pressure on the rim when the turnbuckle is being contracted, the heads forming outwardly facing seats, adapted to bear on the inner surface of the rim to prevent rotation of the end members with the central member and exert expanding pressure on the rim when the turnbuckle is being elongated, the hooks being shiftable on their pivots so that they are adapted to be retracted under the heads to expose said seats, and provided with laterally projecting studs between their pivoted and swinging ends; and contractile springs connecting the studs of each pair of hooks and offset by the studs from the heads, so that the springs are shiftable with the hooks and are adapted to draw the hooks inward against the rim flanges when the hooks are projected, and to draw the hooks inward under the heads when the hooks are retracted, so that the retracted hooks are confined in out of the way positions.

2. A tire rim tool comprising a turnbuckle including an internally threaded rotatable central member, and externally threaded end members movable longitudinally in opposite directions by the rotation of the central member; heads fixed to the outer ends of the end members and including hubs and arms projecting from opposite sides of the hubs and overhanging the end and central members at opposite ends of the tool; hooks pivoted in pairs to the outer ends of the arms and adapted to be projected outward lengthwise of the tool and engage the flanges of a split rim to exert contracting pressure on the rim when the turnbuckle is being contracted, the outer ends of the head hubs and the outer sides of the head arms forming outwardly facing seats, adapted to bear on the inner surface of the rim to prevent rotation of the end members with the central member and exert expanding pressure on the rim when the turnbuckle is being elongated, the hooks being shiftable on their pivots so that they are adapted to be retracted under the head arms to expose said seats, the hooks being provided with laterally projecting studs between their pivoted and swinging ends; and contractile springs connecting the studs of each pair of hooks and offset by the studs from the heads, so that the springs are shiftable with the hooks and are adapted to draw the hooks inward against the rim flanges when the hooks are projected, and to draw the hooks inward under the heads when the hooks are retracted, and confine the retracted hooks in out of the way positions.

In testimony whereof I have affixed my signature.

GEORGE W. BERRY